Sept. 4, 1962  G. H. HURST, JR., ETAL  3,052,135
GEAR SHIFTING MECHANISM
Filed March 24, 1961  5 Sheets-Sheet 1

INVENTORS
GEORGE H. HURST JR.
WILLIAM G. CAMPELL
BY
ATTORNEY

Sept. 4, 1962 G. H. HURST, JR., ETAL 3,052,135
GEAR SHIFTING MECHANISM

Filed March 24, 1961 5 Sheets-Sheet 2

INVENTORS
GEORGE H. HURST JR.
WILLIAM G. CAMPELL
BY
ATTORNEY

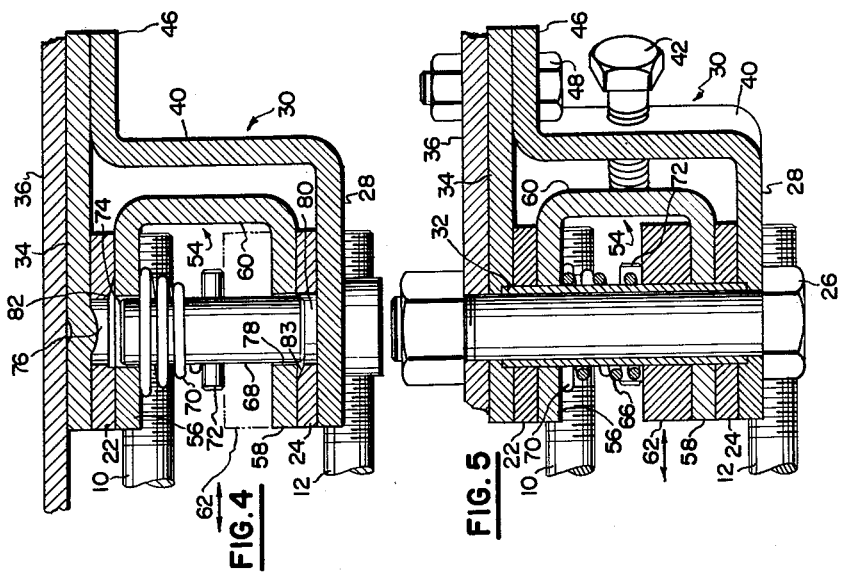

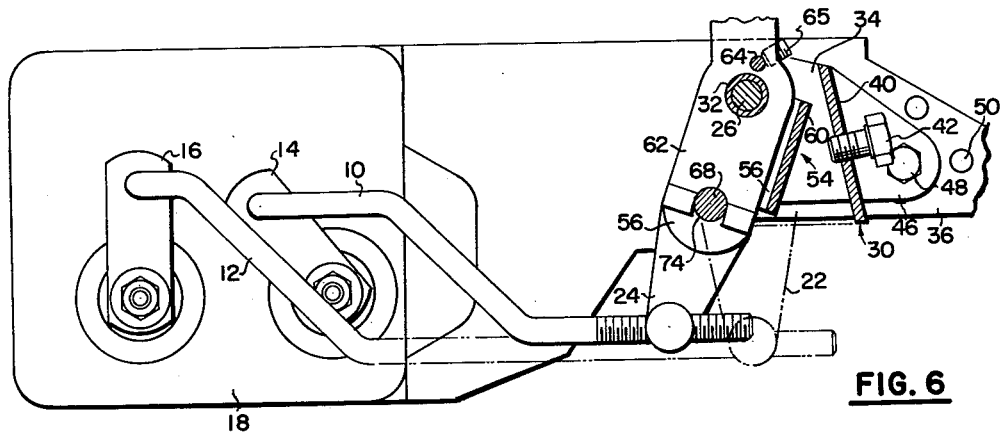
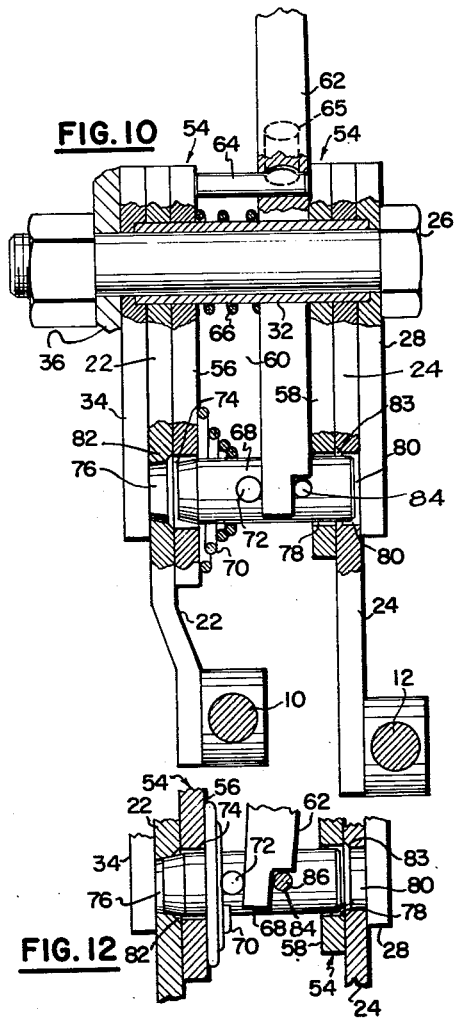
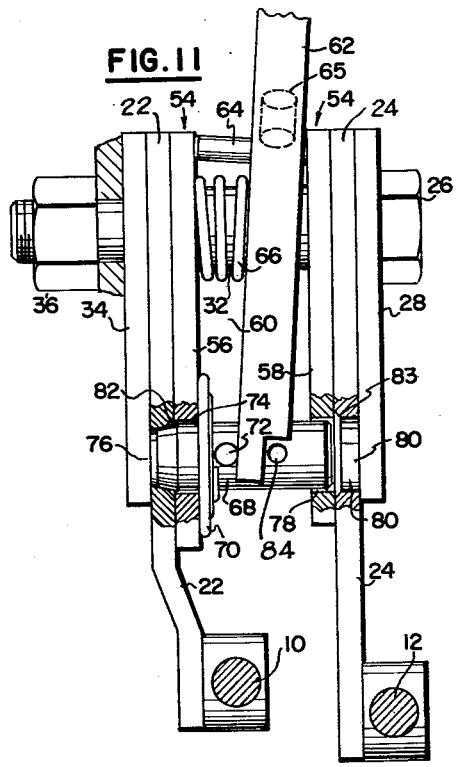
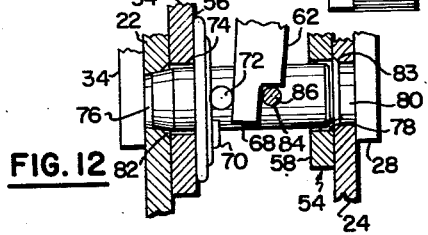

United States Patent Office

3,052,135
Patented Sept. 4, 1962

3,052,135
GEAR SHIFTING MECHANISM
George H. Hurst, Jr., Ambler, Pa. (1511 Old York Road, Abington, Pa.), and William G. Campbell, 1511 Old York Road, Abington, Pa.
Filed Mar. 24, 1961, Ser. No. 98,051
6 Claims. (Cl. 74—473)

This invention relates to a gear shifting mechanism of the type used to change gear ratios of automotive vehicles and other engines.

One object of the invention is to produce an improved gear shifting mechanism of the type set forth.

One type of conventional gear shifting mechanism includes a first actuating lever which, when moved rearwardly, shifts to low gear and which, when moved forwardly, shifts into reverse; a second actuating lever which, when moved forwardly, shifts to high and which, when moved rearwardly, shifts into high gear; an operating handle, and an engaging pin carried by the handle and selectively engageable with either of said levers. To use this type of mechanism, the handle must be moved to neutral position and it must be manually moved to the right, across the neutral "gate" prior to shifting to second and high gears; or the handle must be manually moved to the left prior to shifting to low or reverse. Because the fore and aft movement of the handle between second and high gear is substantially parallel to its fore and aft movement between reverse and low, and because the neutral "gate," in a sense, connects these two paths of movement near their centers, this type of shifting mechanism is commonly known as the standard H pattern shifting mechanism. For example, if the operating handle is in neutral position, it must first be moved to, and across, the neutral "gate," or the bar of the H before it can be moved to the desired gear position. Manually moving the operating handle across the neutral "gate" involves effort and lost time and motion and, in order to reduce the "load" and to expedite shifting, it has been proposed to spring load the engaging pin, or the lower end of the operating handle in such a manner that, if it is moved to the neutral position, the handle, and the engaging pin carried thereby will be spring-biased to the right, or the position from which the handle can be moved forwardly to shift to second, or rearwardly to shift into high gear. This improvement eliminated the need for manually moving the handle laterally prior to shifting to second, or to high gear, and for ordinary uses, this spring loaded shifting mechanism is satisfactory. But, for racing cars, police cars and other emergency vehicles where time and motion are critical, the driver must be able to shift from low to second gear and from second to high gear in a continuous straight line motion and extremely rapidly. Experience has shown that in the improved, spring loaded gear shift mechanism above describd, the movement of the operating handle and the connected engaging pin is not rapid enough for a race car driver who, having shifted to low gear while the car was standing still, now shifts to second gear by violently and forcefully slamming the operating handle toward second gear position for maximum speed under conditions where one hundredth part of a second can make the difference between winning or losing.

Investigation and experimentation have shown that the difficulty, or the major portion thereof, is attributable to the fact that the operating handle and the engaging pin are inter-connected and are biased by a single spring which is not free to act until both the handle and the engaging pin have reached the neutral position.

It is therefore a further object of the invention to produce an improved mechanism wherein the operating handle is moved across the neutral gap by a separate spring and as soon as it has reached the low gear position and in which the engaging pin is biased into engagement with the second actuating lever for shifting to second and to high gear, by a separate spring and simultaneously with the arrival of the operating handle at neutral position whereby the operating handle can be moved from low to second gear (and from second to high gear) by a rapid, uninterrupted straight line motion.

It is therefore a further object of the invention to produce an improved gear shifting mechanism in which the operating handle is separable from the engaging pin and is moved across the neutral "gate" by one spring and in which the engaging pin is moved across said gap by a separate spring, said springs acting in rapid succession and in time relation to the movement of the handle from one gear position to another.

Because of the tenseness and urgency, the driver of a racing car, of a police car, or of an ambulance, especially in shifting from low to second gear, tends to move the operating handle very rapidly and with a force far in excess of that needed to shift the gears, with consequent damage to the gear shifting mechanism.

It is therefore a still further object of this invention to provide a stop for limiting the movement of the operating handle while moving from the low to the second gear position to prevent damage to the gear shifting mechanism.

The full nature of the invention will be understood from the following specification and the accompanying drawings in which:

FIG. 3 is similar to FIG. 1, but viewing the parts from a slightly different angle.

FIG. 4 is an enlarged, sectional view looking in the direction of line 4—4 on FIG. 1.

FIG. 5 is an enlarged, sectional view looking in the direction of line 5—5 on FIG. 1.

FIGS. 6, 7, 8 and 9 are skeletal views showing the position of some of the parts in the low, second, high and reverse gear positions, respectively.

FIG. 10 is a view, partly in section, and partly in elevation, showing the gear shifting mechanism of the present invention ready for shifting to second, to high gear position, or back.

FIG. 11 is similar to FIG. 10, but showing the position of the parts when the operating handle is moved to shift into low gear.

FIG. 12 is a view similar to the lower portion of FIG. 11, showing how the gear shifting mechanism of this invention can be adapted for use as a conventional spring loaded gear shifting mechanism.

Since shifting into low, or into reverse, gear is usually done when the vehicle is standing still, it presents no problem. Therefore, the invention will be described in connection with shifting from low to second gear and from second to high gear, and from high to second gear, and any reference hereinafter made to the low, and reverse, gear positions is only by way of orientation to facilitate understanding of the invention.

Figure 1:
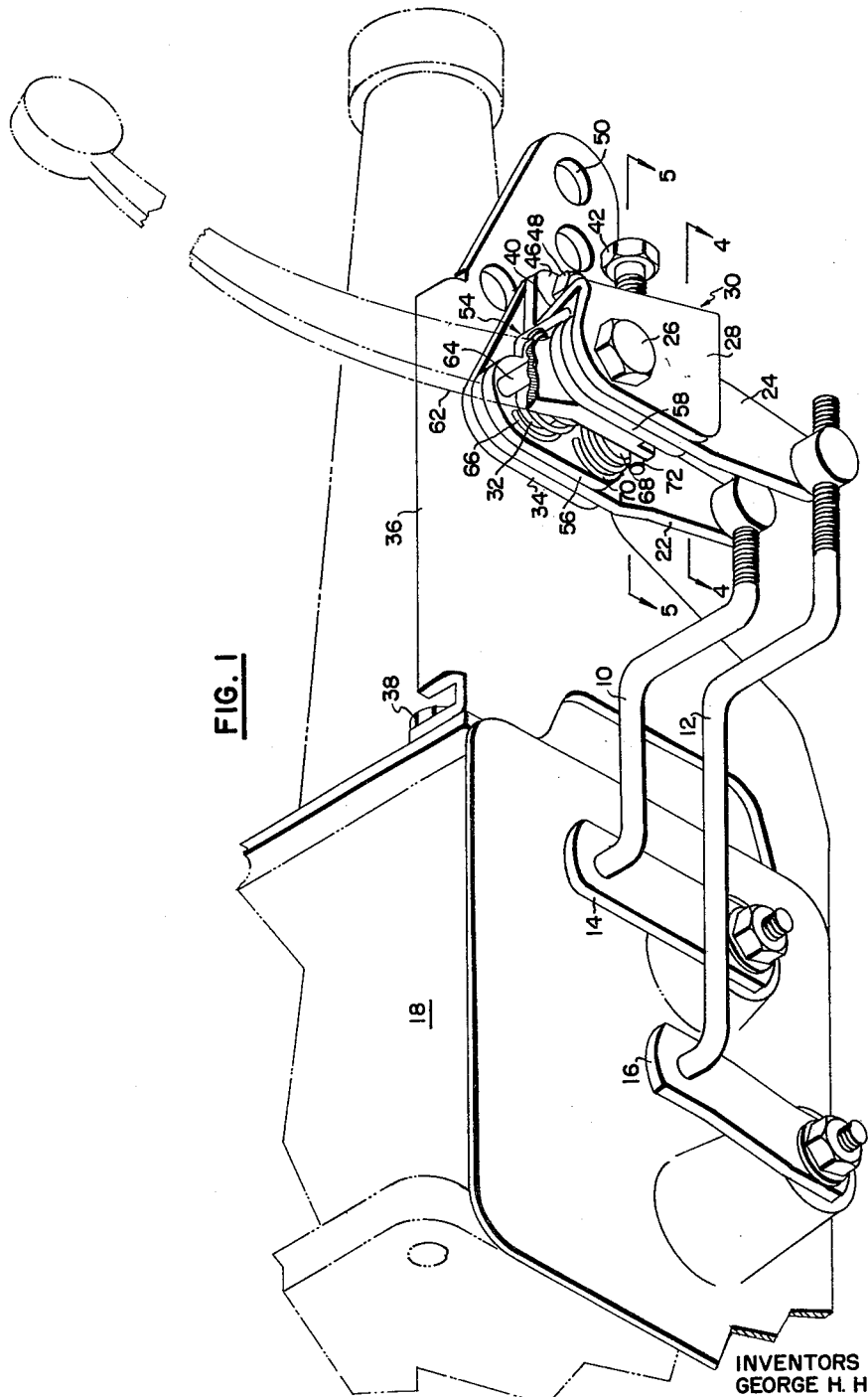
FIG. 1 is a perspective view showing the gear shifting mechanism embodying the invention mounted on the side of the gear box of an automotive vehicle.

The gear shifting mechanism illustrated includes two connecting rods 10 and 12 which are pivotally and adjustably connected, at one end thereof, to the upper ends of gear shift levers 14 and 16, the lower ends of which are operatively connected to the usual gear trains in gear box 18 in the well-known manner. Since the gear trains and their operation form no part of the present invention, they are not shown, nor described. The other ends of rods 10 and 12 are adjustably connected to the lower ends of actuating levers 22 and 24, respectively. The upper ends of levers 22 and 24 are rotatable on bolt 26 which also passes through outer wall 28 of a mounting bracket 30; through bushing 32; through inner mounting plate 34, and through outer mounting plate 36, which is bolted to the gear box 18, as at 38. See FIG. 1. Bracket 30 also includes intermediate wall 40 which carries adjustment set screw 42, which is hereinafter further referred to, and end wall 46, which is secured to inner mounting plate 34 and to outer plate 36 by bolts 48. Plate 36 is provided with a number of adjustment holes 50 which are selectively engageable by bolt 26 so that, by adjusting connecting rods 10 and 12 relative to levers 14 and 16, or to levers 22 and 24, or to both, and by selectively engaging bolt 26 with one, or another, of holes 50, the unit can be quickly, easily and accurately adjusted, according to the make of the car and the convenience of the driver.

Figure 2:
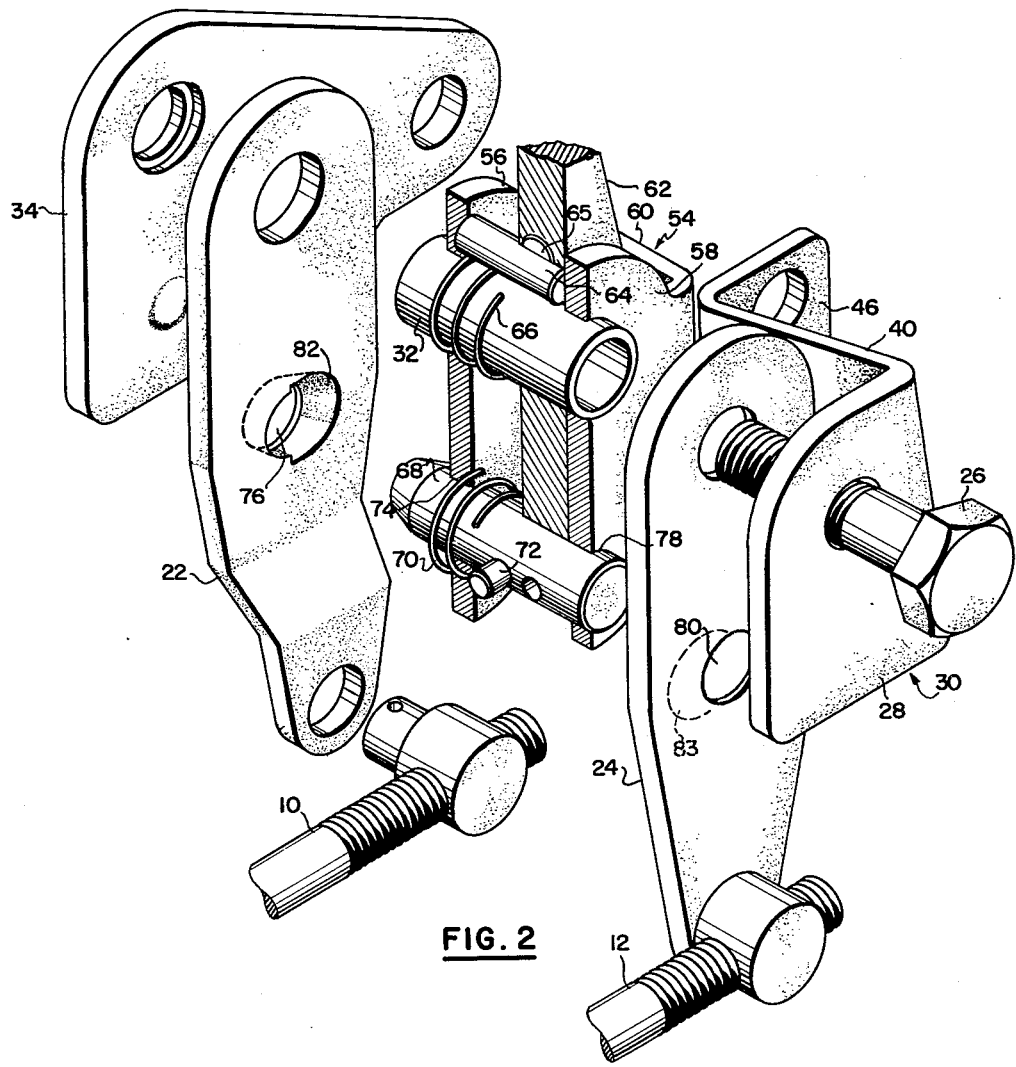
FIG. 2 is an enlarged, exploded view showing the various parts of the mechanism shown in FIG. 1 with the gear box omitted.

Bushing 32 rotatably carries a U-shaped bracket 54, the side walls 56 and 58 of which abut levers 22 and 24, respectively, and the bight portion 60 of which is adapted to engage the adjacent end of screw 42 for the purpose hereinafter set forth. Bushing 32 also rotatably carries operating handle 62 which is movable axially of pin 64 so as to be moved closer to, or further away from, the knee of the driver. Handle 62 is held in adjusted position relative to pin 64 by set screw 65 and, at its junction with pin 64, the handle is biased toward lever 24, or to the right as viewed in FIGS. 2, 10 and 11, by spring 66 which is coiled about bushing 32. The lower end of handle 62 slidably carries engaging pin 68 and is biased in the same direction by spring 70 which is coiled on pin 68 and is confined between wall 56 of U-shaped bracket 54 and a stop 72 carried by said pin. By this arrangement, in the absence of external restraint, spring 66 keeps operating handle 62, and spring 70 keeps pin 68 and, indirectly, operating handle 62, in the position of FIG. 10, which will be hereinafter referred to.

Wall 56 of U-shaped bracket 54 is provided with an opening 74, which is adapted to register with opening 76 in actuating lever 22, and wall 58 of said U-shaped bracket is provided with an opening 78 which is adapted to register with opening 80 in lever 24. It will be noted that opening 76 in lever 22 is tapered; that the end of pin 68 which engages this opening is also tapered; that lever 22 is relieved to form a ramp 82 which borders one side of opening 76, and that lever 24 is relieved to provide a ramp 83 which borders the opposite side of opening 80.

Figure 7:
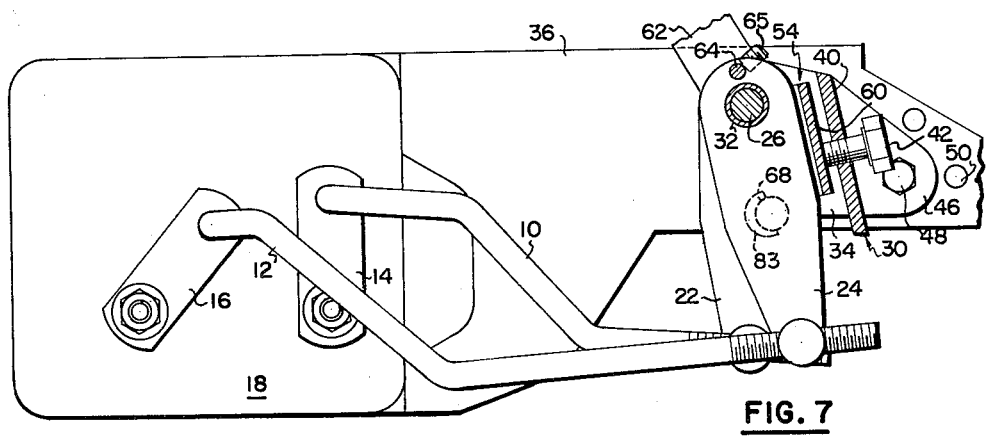
Figure 8:
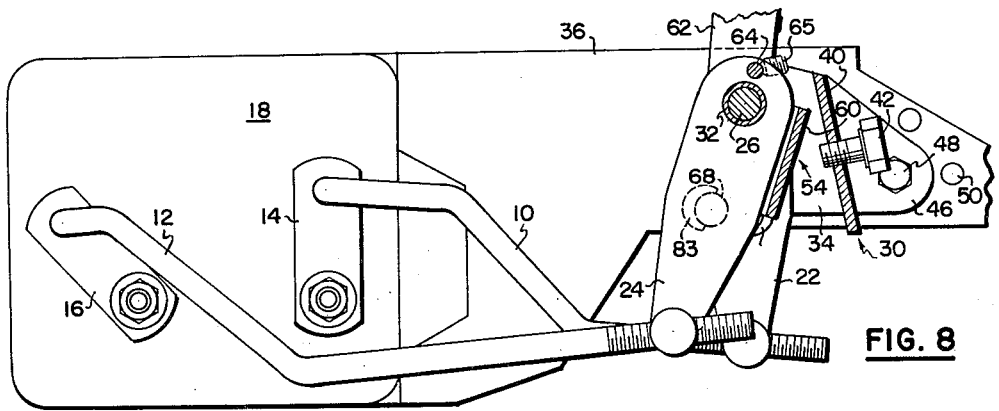

The operation is as follows:

When operating handle 62 is in the neutral position, opening 74 in wall 56 of U-shaped bracket 54 registers with opening 76 in actuating lever 22 and opening 78 in wall 58 of said bracket registers with opening 80 in actuating lever 24. But, since in the absence of external restraint, springs 66 and 70 bias operating handle 62 and engaging pin 68, to the right, as viewed in FIG. 10, pin 68 will enter opening 80 to integrate operating handle 62 with actuating lever 24 which, as will be seen from FIGS. 7 and 8, is responsible for shifting from neutral to second and from second to high gear and back. In other words, according to this invention, the handle, when not controlled by the driver, is always integrated with actuating lever 24 so that the operator has only to move the upper portion of the handle forwardly, in a straight line, to go into second gear, or rearwardly, in a straight line, to go into high gear, without having to cross the neutral "gate." In other words, the operating handle does not have to be moved laterally across the bar of the standard H pattern and need only be moved, in a straight line, forwardly or rearwardly, from neutral to second gear and from second to high, or from high back to second gear.

Figure 9:
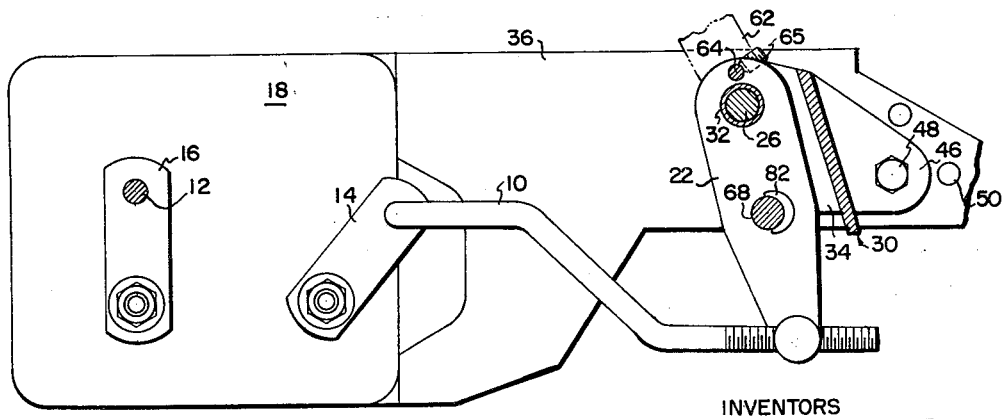

To shift to low gear, handle 62 is cocked to the position illustrated in FIG. 11 so as to withdraw pin 68 from the opening 80 in actuating lever 24, and to cause the opposite tapered end of the pin to enter opening 76 in actuating lever 22 to integrate operating handle 62 with actuating lever 22. When the parts are in the position of FIG. 11, forward motion of the handle shifts to reverse (FIG. 9) and rearward motion of the handle shifts to low gear (FIG. 6) in the well-known manner. When the operating handle is moved to the neutral position, springs 66 and 70 coact to move the parts back to the position of FIG. 10 in which the operating handle is again integrated with lever 24 so that forward motion of the handle, in a straight line, will shift to second and rearward motion of the handle, in a straight line, shifts to high, and vice versa. In other words, unless the operating handle is forcibly moved to the position of FIG. 11, for movement to low, or to reverse gear, it is always in the position of FIG. 10 and ready for shifting to second or to high gear and back to second gear. Therefore, in the sense that the driving gears are out of mesh, the gear shifting mechanism of this invention does have a neutral position. But, in the sense that the operating handle is wholly out of engagement with both of levers 22 and 24, as in the conventional standard H pattern, the operating handle of this invention has no neutral position because, as stated, when it is not in, or being moved toward low, or reverse, gear position, the handle is in position for shifting to second or to high.

As stated, in the first type of conventional standard H pattern shifting mechanism referred to, the driver, having engaged the operating handle with lever 22, must, after having moved lever 14 to the position of FIG. 6, positively disengage the operating handle from lever 22; he must move to neutral and must manually move the operating handle across the neutral "gate." In the second spring-loaded type of mechanism, the spring must move both the handle and the engaging pin which corresponds to pin 68 herein and which is secured to the handle. Because of this, and because the spring cannot being to act until the handle has actually reached the neutral position, movement of the handle across the neutral "gate" is not as fast as demanded by the very fast movement of the handle from the low to the second gear position.

The driver of a racing, or emergency, car "slams" the operating handle into low gear position. This means that the operating handle and lever 22 will be pushed, somewhat, beyond the position of FIG. 6 and therefore the rounded, tapered end of pin 68 will be forced out of opening 76. Having reached the end of the stroke, the driver instinctively relaxes the lateral pressure on the handle while reversing direction and spring 66 immediately moves the handle toward lever 24, or to the position of FIG. 10. Therefore, the operating handle will be placed in position for continuous, straight line, forward shifting motion to second gear position of FIG. 7 automatically and immediately on completion of the shifting to gear. As the operating handle crosses the neutral position, the opposite end of pin 68 will be pushed against ramp 83 to bring it close to opening 80 in lever 24 so that, as soon as the pin registers with opening 80, spring 70 which was loaded, or "cocked," as shown in FIG. 11, by the movement of the handle into low gear position, now "fires" pin 68 the remaining distance into opening 80 to entrain lever 24 with the operating handle as the latter is being moved to the second gear position. In other words, the preparatory movement of the operating handle toward lever 24, which is what makes straight line shifting automatic, leaves nothing to be done but the engagement of pin 68 with opening 80, but this also takes place instantaneously and automatically because pin 68, under pressure of spring 70, enters opening 80 even in the very small fraction of a second which it takes the handle to pass across the inner face of lever 24. It will be noted that once pin 68 engages lever 24, it is retained in that position by spring 70 until it is forcibly disengaged by movement of the operating handle in shifting to low gear, as above explained.

The driver of a racing car also tends to ram the operating handle into second gear with excessive force which, if not resisted, can damage the various levers, or connecting rods. According to this invention, and as shown, in FIGS. 5 and 7, set screw 42 is so adjusted that, as soon as the operating handle has moved forwardly far enough to shift to second gear, as shown in FIG. 7, bight portion 60 of U-shaped bracket 54 abuts screw 42 and prevents distortion of the levers and other parts.

To convert the straight line shifting mechanism of this invention to the conventional, spring loaded type above referred to, pin 68 is provided with opening 84 FIGS. 3 and 11, for receiving pin 86, FIG. 12 which, in effect, renders spring 66 superfluous because when pin 86 is used, the handle 62 and pin 68 will both be moved toward lever 24 by spring 70, exclusively. As above pointed out, this arrangement is satisfactory for ordinary usage, but does not respond with the extreme speed needed in driving a racing, police, or other emergency, car.

From the foregoing, it will be seen that by making pin 68 movable relative to operating handle 62, and by providing spring 66, a conventional spring loaded, H pattern gear shifting mechanism is converted into continuous, straight line, extremely rapid shifting from low to second, from second to high, and from high to second gear, that by providing ramps 82 and 83, the engagement of pin 68 with levers 22 and 24 is facilitated; that by tapering, or rounding, the end of pin 68 which engages opening 76 and by tapering, or rounding, opening 76, pin 68 will be forced out of opening 76 by pressure applied to the handle beyond that needed to shift to low gear, thus avoiding damage and preparing the handle 62 and pin 68 for movement toward lever 24; that by providing set screw 42 the parts are protected against violent shifting to second gear, and that by merely inserting pin 86 in opening 84 in engaging pin 68, the mechanism is instantaneously converted to a conventional, spring loaded, standard H pattern mechanism.

What we claim is:

1. A gear shifting mechanism including a first actuating lever movable to a first position to shift to low gear and to a second position to shift to reverse gear, a second actuating lever movable to a third position to shift to second gear and to a fourth position to shift to high gear, and operating handle having a neutral position, an engaging pin freely movable transversely of said handle for selective engagement with said first and said second actuating levers for selectively operatively connecting said handle with said first and second levers, means operable upon movement of said handle in first, and reverse, gear shifting direction for engaging said pin with said first actuating lever and means for automatically moving said pin toward said second actuating lever as soon as said handle is released and independently of the movement of said handle toward said neutral position whereby said pin is in a position to engage said second actuating lever during rapid movement of said handle from low to second gear shifting direction.

2. The structure recited in claim 1 in which said last-mentioned means is a spring which is compressed by engagement of said pin with said first-mentioned lever and is operative, upon release of said handle, to move said pin toward said second actuating means.

3. The structure recited in claim 1 and additional means for moving said handle, when unrestrained, toward second actuating lever.

4. The structure recited in claim 3 in which said additional means is a spring which is compressed by movement of said handle to low, or to reverse, gear position.

5. The structure recited in claim 1 in which said first and second actuating levers have holes therein which register in the neutral position of said handle for selective engagement with said pin, and ramps formed on opposite sides of said holes for guiding the opposite ends of said pin into selective engagement with one of said holes.

6. The structure recited in claim 5 in which the end of said pin which engages said first actuating lever is rounded to facilitate the disengagement of said pin from said first actuating lever.

References Cited in the file of this patent

UNITED STATES PATENTS

| | | |
|---|---|---|
| 742,630 | Grist | Oct. 27, 1903 |
| 907,720 | Biszantz | Dec. 29, 1908 |
| 1,078,107 | Nygren | Nov. 11, 1913 |
| 2,274,539 | Fishburn | Feb. 24, 1942 |
| 2,284,191 | Fishburn | May 26, 1942 |
| 2,961,890 | Marshall | Nov. 29, 1960 |
| 3,018,670 | Lohn | Jan. 30, 1962 |